United States Patent
Kamahori

[11] Patent Number: 5,431,486
[45] Date of Patent: Jul. 11, 1995

[54] DISC ROAD WHEEL HAVING GAS VENTILATION GROOVES BETWEEN THE RIM AND THE DISC

[75] Inventor: Shuya Kamahori, Chigasaki, Japan

[73] Assignee: Nissan Motor Co., Ltd., Yokohama, Japan

[21] Appl. No.: 145,176

[22] Filed: Nov. 3, 1993

[30] Foreign Application Priority Data

Nov. 13, 1992 [JP] Japan .................. 4-304037

[51] Int. Cl.⁶ ............................................ B60B 23/00
[52] U.S. Cl. ................................. 301/63.1; 228/168; 156/87
[58] Field of Search ............ 301/63.1, 65, 95, 97; 156/87; 228/165, 168, 169, 211

[56] References Cited

U.S. PATENT DOCUMENTS

| | | | |
|---|---|---|---|
| 3,601,45 | 8/1971 | Baker | 301/63.1 |
| 3,432,207 | 3/1969 | Holmstrom | 301/63.1 |
| 3,612,614 | 10/1971 | Ware | 301/63.1 X |
| 3,625,568 | 12/1971 | Verdier | 301/63.1 |
| 4,284,228 | 8/1981 | Cetrelli | 156/87 X |

FOREIGN PATENT DOCUMENTS 2523356 12/1975 Germany .................. 301/63.1

OTHER PUBLICATIONS

"Automotive Engineering Complete Book", Production Method of Automotive Vehicle, vol. 19, Apr. 20, 1980, pp. 155–156 (in Japanese Language Only).

Primary Examiner—Russell D. Stormer
Attorney, Agent, or Firm—Foley & Lardner

[57] ABSTRACT

A disc road wheel on which a tire is fitted. The disc road wheel has a disc formed with an outer peripheral annular flange section which is press-fitted to the inner peripheral section of a rim. The flange section is formed at its outer peripheral surface with a plurality of gas leak grooves which are aligned along a peripheral direction of the disc. Each gas leak groove is in communication with ambient air even upon press-fitting of the disc and the rim, so that gas between the disc and the rim can be discharged through the gas leak grooves during welding.

8 Claims, 4 Drawing Sheets

DISC ROAD WHEEL HAVING GAS VENTILATION GROOVES BETWEEN THE RIM AND THE DISC

BACKGROUND OF THE INVENTION

1. Field of the Invention

This invention relates to improvements in a disc road wheel which is produced by press-fitting an outer peripheral section of a disc to an inner peripheral section of a rim and by welding them, and more particularly to such a disc road wheel in which a blow hole is effectively prevented from being formed in a welding bead (re-solidified) portion formed by the welding.

2. Description of the Prior Art

A conventional disc road wheel is usually formed by press-fitting the outer peripheral section of a disc to the inner peripheral section of a rim, and then by welding the disc outer peripheral section and the rim inner peripheral section along a peripheral direction, in which a welding bead (re-solidified linear deposit of molten metal) is formed along the periphery of the rim. This is, for example, disclosed in "Automotive Engineering Complete Book", Volume 19 ("Production Method of Automotive Vehicle"), published by Kabushiki-Kaisha Sankai-do, the first edition published on Apr. 20, 1980.

However, drawbacks have been encountered in the above conventional disc road wheel. That is, assume that welding of the rim and the disc is made by using a laser beam under a state in which remaining liquid materials such as machining oil and/or cleaning solvent exist between the disc and the rim. At this time, the remaining liquid materials such as machining oil and/or cleaning solvent are rapidly heated by the laser beam and promptly vaporized thereby developing a high internal pressure between the disc and the rim. This high internal pressure blows up molten metal during the welding so that drops of the molten metal are splashed. Accordingly, there is the possibility of blowholes being formed in the welding bead (re-solidified linear deposit of the molten metal) thereby causing welding defects.

Otherwise, in order to avoid the formation of blowholes in the welding bead, it may be proposed to remove the machining oil, cleaning solvent and/or the like existing on the surface of the disc and/or the rim at portions to be press-fitted to each other under rinsing, prior to the press-fitting of the disc to the rim. However, there arise difficulties in which a considerably high pressure is required during the press-fitting, and galling will be produced between the disc and the rim.

SUMMARY OF THE INVENTION

It is an object of the present invention to provide an improved disc road wheel which can effectively overcome drawbacks encountered in conventional disc road wheels having similar structures.

Another object of the present invention is to provide an improved disc road wheel by which welding defects cannot be produced even though remaining materials such as machining oil and/or cleaning solvent exist between a disc and a rim which are to be subjected to a press-fitting and welding.

A further object of the present invention is to provide an improved disc road wheel by which molten metal is prevented from being scattering during welding so that blowholes cannot be formed in a welding bead, even though machining oil and cleaning solvent remain between disc and rim which have been subjected to press-fitting. The machining oil and the cleaning solvent purposely remained between the disc and the rim to be used as lubricants during press-fitting of the disc to the rim.

A disc road wheel of the present invention comprises a rim having an annular inner peripheral section. A disc has an annular outer peripheral section which is press-fitted and welded to the rim inner peripheral section. Gas leak grooves are formed on an outer peripheral surface of the rim outer peripheral section. Each gas leak groove is in communication with ambient air.

By virtue of the gas leak grooves formed on the outer peripheral surface of the disc, even if the remaining material such as machining oil and/or cleaning solvent exists between the rim and disc after press-fitting and is gasified under heating during welding, the gasified material can be discharged into ambient air thereby preventing the internal pressure between the rim and the disc from rapidly increasing. Thus, blowholes can be prevented from being formed in a welding bead (re-solidified deposit of molten metal) thereby avoiding production of welding defects.

In view of the above, it is permissible that the disc is press-fitted to the rim under a state in which machining oil and/or cleaning solvent are attached on the surfaces of the disc outer peripheral section and the rim inner peripheral section. Accordingly, the press-fitting of the disc to the rim can be smoothly made under the lubricating action of the above attached substances thereby requiring no excessively high press-fitting force. This never causes galling between the disc and the rim thus ensuring a high press-fitting precision.

BRIEF DESCRIPTION OF THE DRAWINGS.

In the drawings, like reference numerals designate like elements and parts throughout all figures, in which.

DETAILED DESCRIPTION OF THE INVENTION

Figure 1:
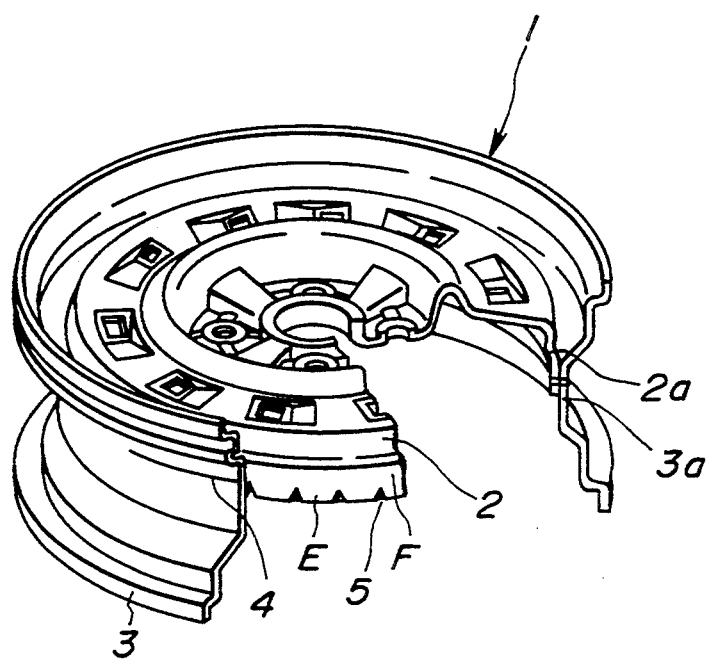
FIG. 1 is a perspective view, partly in section, of an embodiment of a disc road wheel according to the present invention.

Referring now to FIG. 1, an embodiment of a disc road wheel according to the present invention is illustrated by the reference numeral 1. The disc road wheel 1 comprises a rim 3 made of a metal and formed with an inner peripheral section 3a. A disc 2 is formed with an outer peripheral section 2a which is press-fitted to the inner peripheral section 3a of the rim 3. The inner peripheral section 3a of the rim 3 and the outer peripheral section 2a of the disc 2 are welded to each other to form a welding bead (re-solidified linear metal deposit formed during welding) 4 on the outer peripheral surface of the rim 3. The welding bead 4 extends in the peripheral direction of the rim 3. It will be understood that a tire (not shown) is fitted on the rim 3.

The inner peripheral section 2a of the disc 2 includes a generally cylindrical flange section F at which the disc 2 is in press-fitted to and welded to the rim 3. The flange section F is coaxial with the disc 2 and the rim 3. The flange section F has an annular end portion (no numeral) integral with the main body (no numeral) of the disc 2. The other annular end portion E forms an annular free end and located axially opposite to the above-mentioned integral end portion. As clearly shown in FIG. 1, the flange section F is formed with a plurality of gas leak grooves 5 which are aligned along the peripheral direction of the flange section F, in which the number of the grooves 5 is 36 in this embodiment. The gas leak grooves 5 are formed at the annular end portion E of the flange section F and opened to the end edge of the end portion E. In other words, each gas leak groove 5 is positioned to establish communication of ambient air with a clearance between the disc flange section F and the rim inner peripheral section 3a. It will be understood that the clearance may be very small as if there is no clearance between the disc flange section F and the rim inner peripheral section 3a.

Figure 2:
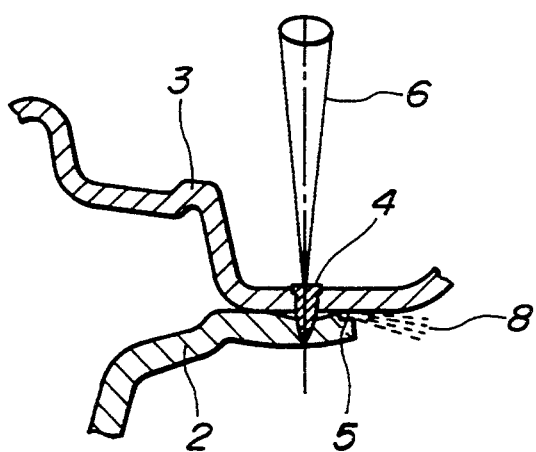
FIG. 2 is a fragmentary sectional view of the disc road wheel, illustrating a state during the production of the disc road wheel of FIG. 1.
Figure 3:
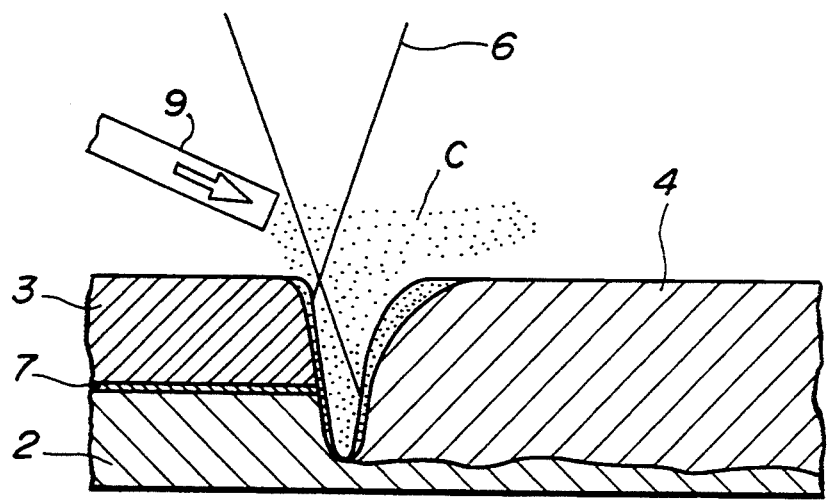
FIG. 3 is a fragmentary sectional view showing the state of formation of a welding bead during the production of the disc road wheel of FIG. 1.

Production of the above disc road wheel 1 will be discussed with reference to FIGS. 2 and 3. First, the outer peripheral section 2a of the disc 2 is press-fitted to the inner peripheral section 3a of the rim 3. Then, the press-fitted sections 2a, 3a are welded to each other, for example, by using laser beam 6 forming the welding bead 4 which extends along the peripheral direction of the rim 3 as shown in FIG. 2. At this time, remaining liquid material 7 such as machining oil and/or cleaning solvent existing between the press-fitted sections 2a, 3a will rapidly vaporize under heating by laser beam 6 thereby generating gas components 8 as shown in FIG. 2. However, the thus generated gas components 8 can leak through the gas leak grooves to the outside or into ambient air as shown in FIG. 2 thereby preventing the internal pressure between the press-fitted sections 2a, 3a from rising. As a result, no welding defect such as a blowhole is produced in the welding bead 4. In FIG. 3, the reference numeral 9 denotes a nozzle for ejecting inert gas so as to remove an oxidizing atmosphere and blow off cloud C of plasma produced under ionization of the metal.

Subsequently, discussion will be made on experimental study of the shapes, locations and the likes of the gas leak grooves 5.

Figure 4:
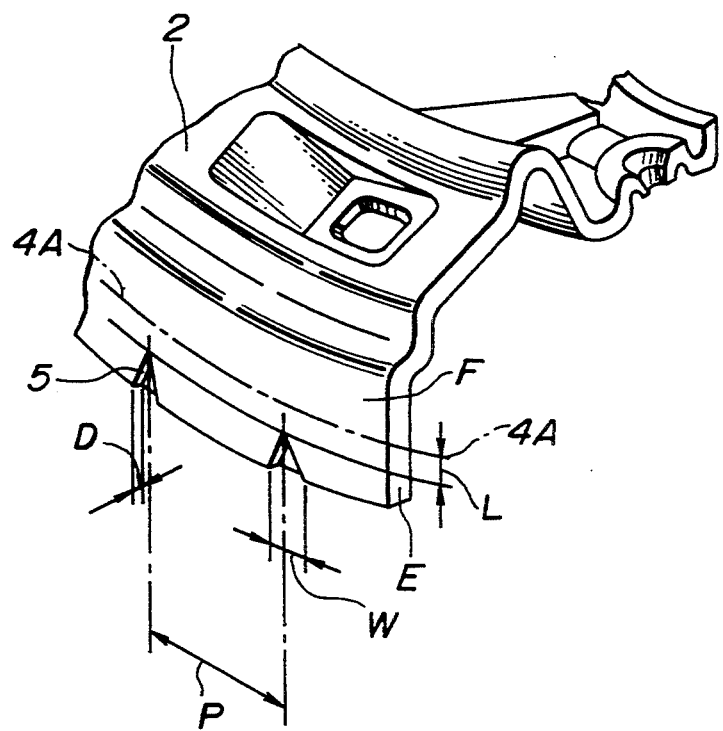
FIG. 4 is a fragmentary perspective view of a disc forming part of the disc road wheel of FIG. 1.

As shown in FIG. 4, each gas leak groove 5 was formed generally triangular-shape in plan, and opened at the end edge of the end portion E of the flange section F and also opened at the outer peripheral surface of the end portion E of the flange section F, so that the gas leak groove 5 is not opened at the inner peripheral surface of the end portion E. In FIG. 4, D was a depth (mm) of each gas leak groove 5; W was a width (mm) of each gas leak groove 5; P was a pitch (mm) of the gas leak grooves 5; and L was a distance (mm) of the gas leak groove 5 from a laser welding position (a line along which laser welding was made) 4A.

Figure 5:
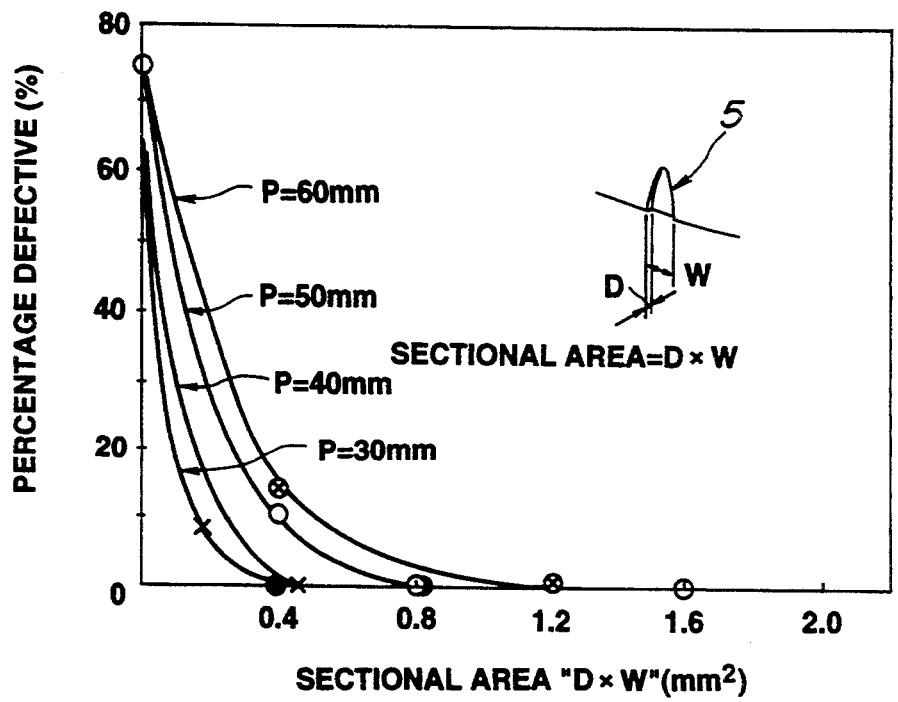
FIG. 5 is a graph showing the relationship between the sectional area (D×W) of each gas leak groove formed on the disc and a percentage defective (%)

First, the relationship between the sectional area (D×W) of the gas leak groove 5 and a percentage defective (%) was measured upon changing the pitch P of the gas leak grooves 5 as 30 mm, 40 mm, 50 mm and 60 mm. The percentage defective (%) means a percentage of defectives in products which defectives were made owing to production of blowhole. It will be understood that the sectional area of the gas leak groove 5 was the product of the depth D and the width W. The result of this measurement is shown in FIG. 5, which reveals that the percentage defective (%) increases as the sectional area of the gas leak groove 5 becomes small because gas leak is insufficient during welding. Accordingly, the sectional area (D×W) of the gas leak groove 5 is preferably not smaller that 0.4 mm$^2$, more preferably not smaller than 0.8 mm$^2$. Additionally, it is preferable that the depth D is not smaller than 0.1 mm.

Figure 6:
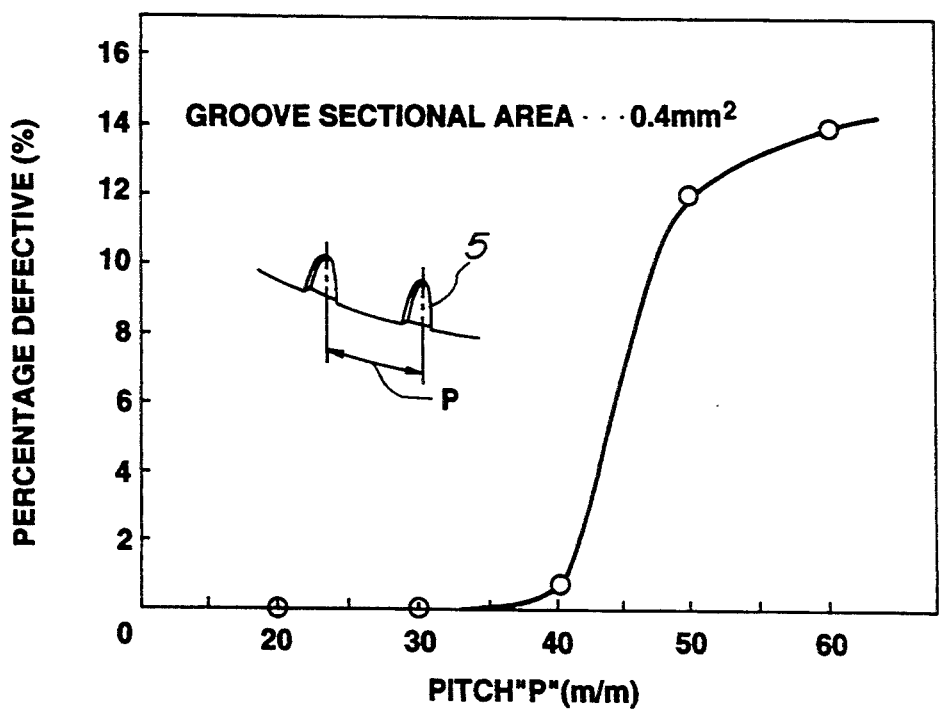
FIG. 6 is a graph showing the relationship between the pitch of gas leak grooves formed on the disc and a percentage defective (%)

Additionally, the relationship between the pitch P of the air leak grooves 5 and the percentage defective (%) was measured under a condition in which the sectional area of the gas leak groove was 0.4 mm$^2$ thereby to obtain a result shown in FIG. 6. The result reveals that the percentage defective (%) increases as the pitch P increases in which gas leak is insufficient during welding. Therefore, the pitch P of the gas leak grooves 5 is preferably not larger than 40 mm, more preferably not larger than 30 mm.

Figure 7:
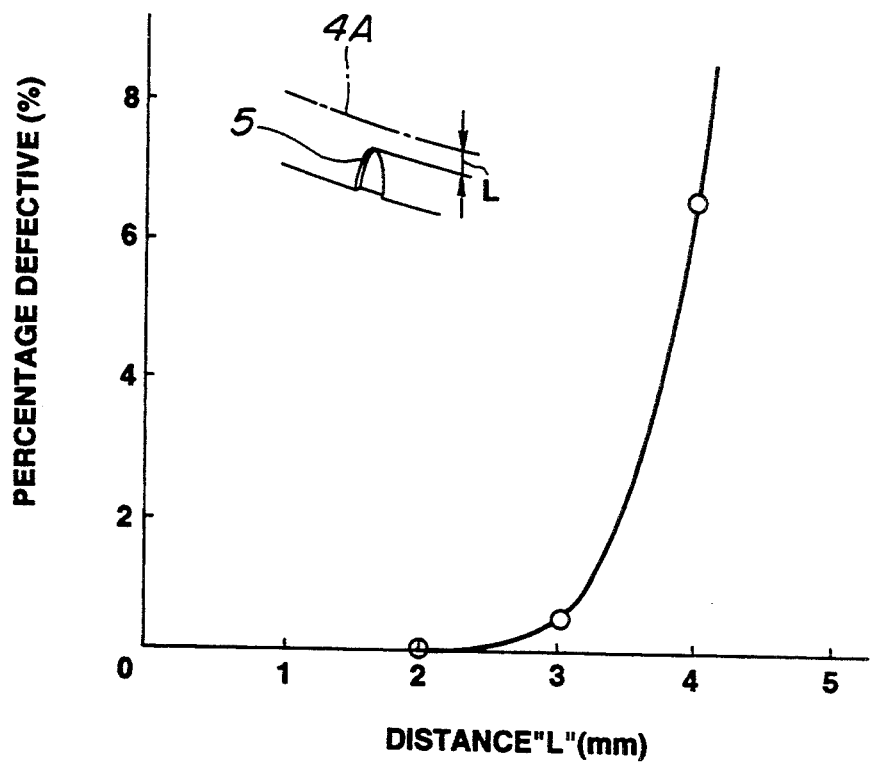
FIG. 7 is a graph showing the relationship between the distance of the gas leak groove from a laser welding position and a percentage defective (%)

Furthermore, the relationship between the distance L and the percentage defective (%) was measured to obtain a result in FIG. 7. It will be understood that the distance L was between the laser welding position 4A and the gas leak groove 5. The result reveals that the percentage defective (%) increases as the distance L increases in which gas leak is insufficient during welding. Therefore, the distance L is preferably not larger than 3 mm, and more preferably not larger than 2 mm.

Thus, it will be appreciated that it is preferable to increase the sectional area (D×W) of the gas leak groove 5, decrease the pitch P of the gas leak grooves 5 and decrease the distance L between the location of the gas leak groove 5 and the laser welding position 4A. However, if the total of the sectional areas of all the gas leak grooves 5 are too large, the occupied surface area of all the gas leak grooves becomes so large that a large stress is applied to the welding bead 4. In this regard, in order not to increase the stress applied to the welding bead 4 to maintain the stress as same as that in a conventional case in which no gas leak groove is formed, it is preferable that the total of the sectional areas of all the gas leak grooves 5 are not larger than 5% of an area at which the rim inner peripheral section 3a and the disc outer peripheral section 2a are press-fitted to each other.

As discussed above, it has been recognized that by forming the gas leak grooves of a suitable number and of a suitable shape at the end portion of the flange section F of the disc 2 and along the peripheral direction of the disc 2, gas leak is effectively made during welding thereby preventing production of blowhole while a sufficient press-fitting force (for example, not less than 2 tons) between the disc 2 and the rim 3 can be ensured thereby maintaining a sufficient high fatigue strength at the press-fitting section of the disc 2 and the rim 3.

Figure 8:
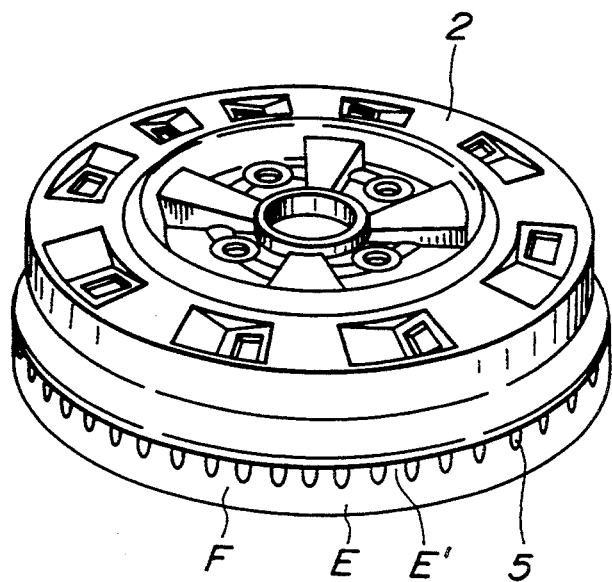
FIG. 8 is a perspective view of a modified example of the disc of the disc load wheel of the present invention.

FIG. 8 illustrates a modified example of the disc 2 of the disc road wheel 1 in accordance with the present invention. In this modified example, 36 gas leak grooves 5 are formed at the annular end portion E' of the annular flange section F of the disc 2. It will be understood that the annular end portion E' is located axially opposite to the annular end portion E, and integral with the main body of the disc 2. Even in this instance, it is possible to ensure obtaining a sufficient gas leak ability and a sufficient fitting area of the disc outer peripheral section 2a and the rim inner peripheral section 3a by suitably selecting the sectional area (D×W) of the gas leak groove 5, the pitch of the gas leak grooves 5, the distance L of the gas leak groove 5 from the laser welding position 4A and the rate of the total of the sectional areas of all the gas leak grooves 5 to the press-fitting area between the disc outer peripheral section 2a and the rim outer peripheral section 3a.

What is claimed is:

1. A disc road wheel comprising:

a rim having an annular inner peripheral section;

a disc having an annular outer peripheral section with an outer peripheral surface which is press-fitted and welded to said rim inner peripheral section;

means defining a confined space between said rim inner peripheral section and said disc outer peripheral section, vaporizable material being confined in said space, said vaporizable material being vaporized under heating produced from welding of said rim and disc;

means defining gas leak grooves formed on said outer peripheral surface of said disc outer peripheral section, said gas leak grooves being in communication with said confined space and with ambient air; and means defining a welding bead formed through said rim and rigidly connected with said disc, the welding bead being in contact with said confined space.

2. A disc road wheel as claimed in claim 1, wherein said gas leak grooves are arranged such that each gas leak groove has a depth (D) not less than 0.1 mm and a sectional area (D×W) not less than 0.4 mm$^2$, a pitch (P) of said gas leak grooves is not larger than 30 mm, and an axial distance (L) of each gas leak groove from a laser welding position at which laser welding is made is not larger than 2 min.

3. A disc road wheel as claimed in claim 2, wherein a total of said sectional areas of all of said gas leak grooves is not larger than 5% of an area at which said disc outer peripheral section and said rim inner peripheral section are press-fitted to each other.

4. A disc road wheel as claimed in claim 1, wherein said outer peripheral section of said disc includes a generally cylindrical flange section having a first end portion integral with a main body of said disc, and a second end portion forming a free end, said first and second end portions being axially opposite to each other, wherein each gas leak groove is formed on an outer peripheral surface of said flange section.

5. A disc road wheel as claimed in claim 4, wherein said each gas leak groove is formed on an outer peripheral surface of said second end portion and opened at an annular end edge of said second end portion.

6. A disc road wheel as claimed in claim 4, wherein said each gas leak groove is formed on an outer peripheral surface of said first end portion and opened through an annular extreme end integral with the main body of said disc.

7. A disc road wheel as claimed in claim 4, further comprising means defining a welding bead formed at an axially central portion located between said first and second end portions, said welding bead being formed through said inner peripheral section of said rim to rigidly connect said flange section of said disc and said inner peripheral section of said rim.

8. A disc road wheel as claimed in claim 1, wherein said gas leak grooves are aligned along a peripheral direction of said disc and arranged at equal intervals.

* * * * *